(12) United States Patent
Horvath et al.

(10) Patent No.: US 6,921,131 B2
(45) Date of Patent: Jul. 26, 2005

(54) SHADE APPARATUS FOR A CHILD CONVEYANCE

(76) Inventors: Tibor Joseph Horvath, 36 King Arthur Boulevard, Bethania, Qld (AU), 4205; Tracy Anne Horvath, 36 King Arthur Boulevard, Bethania, Qld (AU), 4205

( * ) Notice: Subject to any disclaimer, the term of this patent is extended or adjusted under 35 U.S.C. 154(b) by 91 days.

(21) Appl. No.: 10/234,317

(22) Filed: Sep. 5, 2002

(65) Prior Publication Data

US 2003/0042767 A1 Mar. 6, 2003

(30) Foreign Application Priority Data

Sep. 5, 2001 (AU) .............................................. PR7471

(51) Int. Cl.$^7$ .............................................. A47D 15/00
(52) U.S. Cl. .............................. 297/184.13; 135/88.02
(58) Field of Search ........................ 297/184.13, 184.15, 297/184.17; 135/88.02

(56) References Cited

U.S. PATENT DOCUMENTS

| | | | | |
|---|---|---|---|---|
| 4,784,433 A | * | 11/1988 | Purnell-Ayres | 297/184.13 |
| 4,923,249 A | * | 5/1990 | Mattox | 297/184.13 |
| 5,007,674 A | * | 4/1991 | Franc | 297/184.13 |
| 5,277,213 A | * | 1/1994 | Mitchell | 135/88.02 |
| 5,301,999 A | | 4/1994 | Thompson et al. | |
| 5,363,871 A | * | 11/1994 | Garrand et al. | 135/90 |
| 5,553,914 A | * | 9/1996 | Holladay | 297/184.17 |
| D375,423 S | * | 11/1996 | Lapointe | D6/491 |
| 5,795,018 A | * | 8/1998 | Schumacher et al. | 297/184.17 |

FOREIGN PATENT DOCUMENTS

| | | |
|---|---|---|
| AU | S-97155 | 7/1987 |
| AU | S-101344 | 9/1988 |
| AU | S-104789 | 8/1989 |
| AU | S-107012 | 3/1990 |
| AU | S-107124 | 3/1990 |
| AU | S-108645 | 8/1990 |
| AU | S-108681 | 8/1990 |
| AU | S-109329 | 10/1990 |
| AU | S-110689 | 3/1991 |
| AU | S-114350 | 6/1992 |
| AU | S-115587 | 11/1992 |
| AU | S-120327 | 5/1994 |
| AU | S-129681 | 4/1997 |
| AU | S-132445 | 12/1997 |
| AU | S-138141 | 8/1999 |
| AU | S-138465 | 9/1999 |
| AU | 138882 S | 11/1999 |
| AU | S-139443 | 12/1999 |
| AU | S-141512 | 4/2002 |
| AU | S-147352 | 4/2002 |

OTHER PUBLICATIONS

Singapore Airlines, Brochure.

* cited by examiner

Primary Examiner—Peter R. Brown
(74) Attorney, Agent, or Firm—Hoffman Wasson & Gitler PC

(57) ABSTRACT

A shade apparatus (1) for a child conveyance (2) comprising a support (3) attachable to a side (4) of a child conveyance (2) and a shade member (5) hingedly connected to the support (3). The support (3) includes two mounts (12, 13) comprising hook and loop fasteners for attaching to the side (4) of the conveyance (2). The shade member (5) is movable relative to the support (3) between a retracted position (as seen with the left-hand apparatus (1)) whereby ready access to an occupant of the conveyance (1) is permitted and an operative position (as seen with the right-hand apparatus (1)) whereby the shade member (5) shields a head, torso and upper limbs of the occupant.

17 Claims, 3 Drawing Sheets

SHADE APPARATUS FOR A CHILD CONVEYANCE

BACKGROUND ART

Infants and young children generally cannot or will not by themselves escape the potentially dangerous rays of the sun. In child conveyances, such as child car seats, strollers, prams, carriages and the like, the child may be exposed directly to the sun's rays and may thus be at risk of sunburn.

The sun's rays not only have the potential to burn the skin but also to cause the child to overheat. This is of particular concern in motor vehicles where a large area of glass and enclosed environment increases the heating effect of the sun's rays.

Sunshades for child conveyances are known but many of these have problems in that they are complex to operate, expensive to purchase, difficult or damaging to install (in the conveyance or in a vehicle carrying the conveyance), lack adjustability or are slow to adjust, and in some cases have mechanisms dangerous to children. Some known sunshades have the problem that they lack adjustability and shelter the child to the extent that airflow to the child is prevented and the heating effect of the sun's rays is amplified, thus causing the child to overheat. Some known sunshades have the problem that they may first need to be removed from a conveyance in order to provide ready access to the child, such as to enable a carer to attend to the child or remove the child from the conveyance. Examples of known sunshades that have one or more of the problems referred to above include those of U.S. Pat. Nos. 4,784,433 and 5,007,674.

The present inventors have now invented a simple, yet surprisingly effective, shade for a child conveyance that overcomes or at least minimises at least one of the problems referred to above, or provides the consumer with a useful or commercial choice.

SUMMARY OF THE INVENTION

According to a first form of the invention, there is provided a shade apparatus for a child conveyance comprising a support for attachment to a child conveyance and a shade member hingedly connected to the support, wherein the support includes at least one mount for attaching to the conveyance, and wherein the shade member is movable relative to the support between a retracted position whereby ready access to an occupant of the conveyance is permitted and an operative position wherein the shade member extends from a sidewall of the conveyance whereby the occupant is shielded by the shade member.

It will be appreciated by those skilled in the art that the term "sidewall of the conveyance" refers to either or both the longitudinal walls of the conveyance relative to the orientation of the occupant.

Preferably, when in the operative position, the shade member shields the occupant's head, torso and upper limbs from the sun's rays.

The hinged connection enables a carer to access the occupant and to attend to the occupant or to remove the occupant from the conveyance without needing to detach the shade apparatus from the conveyance.

The conveyance may be of any suitable form. Suitable conveyances include a baby capsule, child car seat, pram, pusher, stroller, carriage and the like. The shade apparatus is particularly suitable for use with a conveyance in a vehicle such as a car, boat or the like where the child may be enclosed in a cabin having a large glassed area and exposed to the sun. Since the shade apparatus need not enclose the occupant's head or body and restrict airflow thereto, the occupant is less likely to overheat.

The support and the shade member may be of any suitable shape and size. The support may be elongate and the shade member may be hingedly connected along the length of the support. Preferably, the support together with the shade member are in the form of a wing. The shade member, when viewed in side elevation, may have an extending edge that is arcuately shaped.

The shade member may have one or more pockets for storing articles. The shade member may have vents through which air may flow.

In an embodiment of the invention, the support and the shade member may extend within substantially the same plane when the shade member is in the operative position. In another embodiment, an upper region of the shade member may extend partly or completely over the occupant's head when in the operative position in order to provide protection from overhead sun. The upper region may, for example, extend in a curved manner.

Preferably, when in the retracted position, the shade member extends alongside and in contact with the support. In an embodiment of the invention, the shade apparatus includes a retainer that retains the shade member in the retracted position. The retainer may be any suitable retaining device known to persons skilled in the art such as, for instance, a clip, press stud or a hook and loop fastener (of the type marketed under the Velcro™ brand). Preferably, one part of a press stud is located on the shade member and the other part of the press stud is located on the support.

The shade member may be hingedly connected to the support in any suitable way. The support may be formed integrally with the shade member and an integral hinge may be formed therebetween. An integral hinge may be moulded into the shade apparatus during its fabrication. The hinged connection may be a crease line. Alternatively, the support may be a separate element to which the shade member is connected using an intermediate hinge. Suitable types of hinges are known in the art.

The hinged connection may be in the form of an over-centre hinge whereby the hinge is biased such that the shade member is held in the operative position once the hinge is rotated past an over-centre point and is biased such that the shade member is retained in the retracted position once the hinge is rotated in the other direction past the over-centre point. Simply incorporating a slight curvature in the shade member, whereby the elasticity of the shade member provides the bias for the over-centre hinge arrangement, may form an over-centre hinge. The use of an over-centre hinge allows the shade member to be effectively held in the operative position and conveniently pushed and retained in the retracted position by a caress elbow whilst reaching in to access the occupant In this way the carer's access to the occupant is not hindered by the presence of the shade apparatus.

The mount for attaching the support to the conveyance may be any suitable attachment device known to persons skilled the art. In one aspect the shade apparatus may be in the form of an after market accessory and a universal mount may be provided on the support for engagement with a corresponding member on the conveyance. Alternatively, the support may be permanently secured to the conveyance.

The mount may comprise, for example, a magnetic coupling, hook, clip, press stud, tongue and groove arrangement, or a hook and loop fastener. The support may have one or more mounts in the form of hooks or clips that engage the conveyance. Alternatively, both the support and the conveyance may have respective engagable parts of press studs, tongue and slot arrangements, magnetic couplings, or hook and loop fasteners. For instance, the support may be supplied with one part of a hook and loop fastener affixed thereto and the other part may be supplied for affixing to the conveyance, such as with an adhesive backing.

Preferably, the support is attachable to a side of the conveyance. The support may have additional mounts enabling attachment to other parts of the conveyance, such as to either end of the conveyance.

In an embodiment of the invention, the shade member may itself have a mount for attachment to the conveyance when in the operative position, for holding the shade member in the operative position. The shade member mount may be as mentioned above in respect of the support mount.

Preferably, the support has a first mount comprising a first half of a first hook and loop fastener extending along an upper region of the support and a second mount comprising a first half of a second hook and loop fastener extending along a lower region of the support, and the mount of the shade member comprises a first half of hook and loop fastener extending along a lower region of the shade member, and corresponding second halves of each of the said hook and loop fasteners are disposed on the side of the child conveyance.

The shade member and support may be formed from any suitable material or materials. The shade member and support may be made from panels of wood or sheets of plastics material that are stiff and self supporting. Each panel or sheet may be padded with an expanded polystyrene or polyurethane foam or other suitable padding materials. Preferably, the shade member is self-supporting although in certain embodiments it may be desirable to include stiffening ribs in the shade member. In certain applications the foam may be sufficiently rigid such that the panel or sheet may not be required. Such configurations are desirable in vehicles so that in the event of an accident the likelihood of injury from any impact with the shade member is minimised. Preferably, the shade member and support are covered with a material that is firm, safe and washable. The shade member and support may be covered with fabric material matching that of the conveyance.

The shade member may incorporate a mesh that allows the occupant to see through the shade member whilst still being protected from the effects of the sun's rays. Suitably, a plastics mesh may be used.

In use, depending on the position of the sun and whether airflow to the occupant is desirable, the shade apparatus of the present invention may be attached to one or both sides of the conveyance. Advantageously, the shade apparatus may provide the occupant with protection from winds as well as provide the occupant with a degree of privacy such that a sleeping occupant is prevented from being disturbed by children in adjacent seats or close to the occupant.

In a further embodiment the shade member has an interconnect means that allows the shade member to be connected above the head of the occupant to a like shade member attached to the other side of the child conveyance. The interconnect means may be a hood, separately attachable to the respective shade members, or a simple connection between upper regions of the respective shade members. The connection may involve, for instance, a clip, hook, press stud, or a hook and loop fastener. The interconnect means can provide the occupant with protection from overhead sun.

Certain conveyances such as a child car seat may have a swinging arm pivotally attached to both sides of the car seat that may be raised to allow a child to be placed in and removed from the car seat and lowered to restrain the child in the car seat by extending across the child's lap. According to another embodiment of the invention, when the child conveyance has a sidewall and a swinging arm pivotally connected and rotatable relative thereto, then preferably the support is attachable to the sidewall and the shade member is attachable to the arm, wherein when the arm is rotated to an open position for allowing the occupant access to the conveyance then the shade member is in the retracted position and when the arm is rotated to a closed position for restraining the occupant then the shade member fans out to the operative position.

Preferably, an edge of the shade member is attachable to the arm and the support is pivotally connected to the edge of the shade member. The shade member may be in the form of a fan and crease lines may extend radially from a point at which the support is pivotally connected to the edge of the shade member.

According to a second form of the invention, there is provided a child conveyance having at least one shade apparatus, said shade apparatus comprising a support extending from the child conveyance and a shade member hingedly connected to the support, wherein the shade member is movable relative to the support between a retracted position whereby ready access to an occupant of the conveyance is permitted and an operative position wherein the shade member extends from a sidewall of the conveyance whereby the occupant is shielded by the shade member.

The second form of the invention may have one or more features as described for the first form of the invention.

Preferred embodiments of the present invention will now be described by way of reference to the accompanying drawings. It is to be understood that the accompanying drawings are provided for illustrative purposes and are not intended to limit the scope of the present invention.

DESCRIPTION OF PREFERRED EMBODIMENTS

Figure 1:
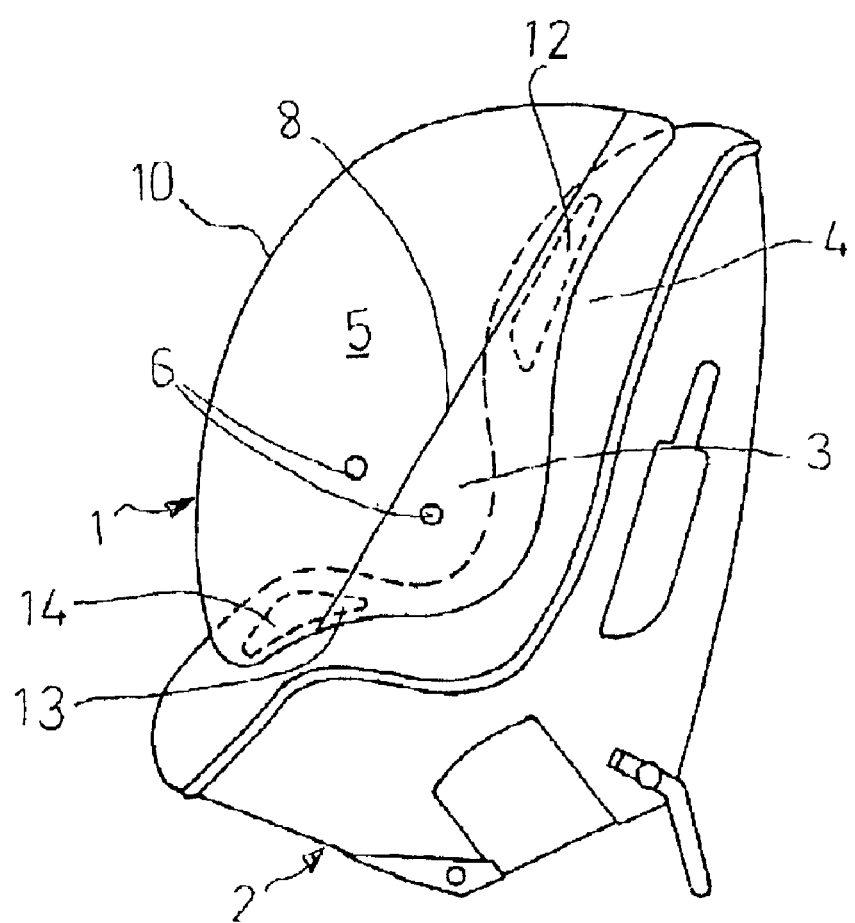
FIG. 1 is a detailed side elevation view of a shade apparatus attached to a child car seat, according to an embodiment of the invention.

In all of the drawings, like reference numerals refer to like parts.

Figure 2:
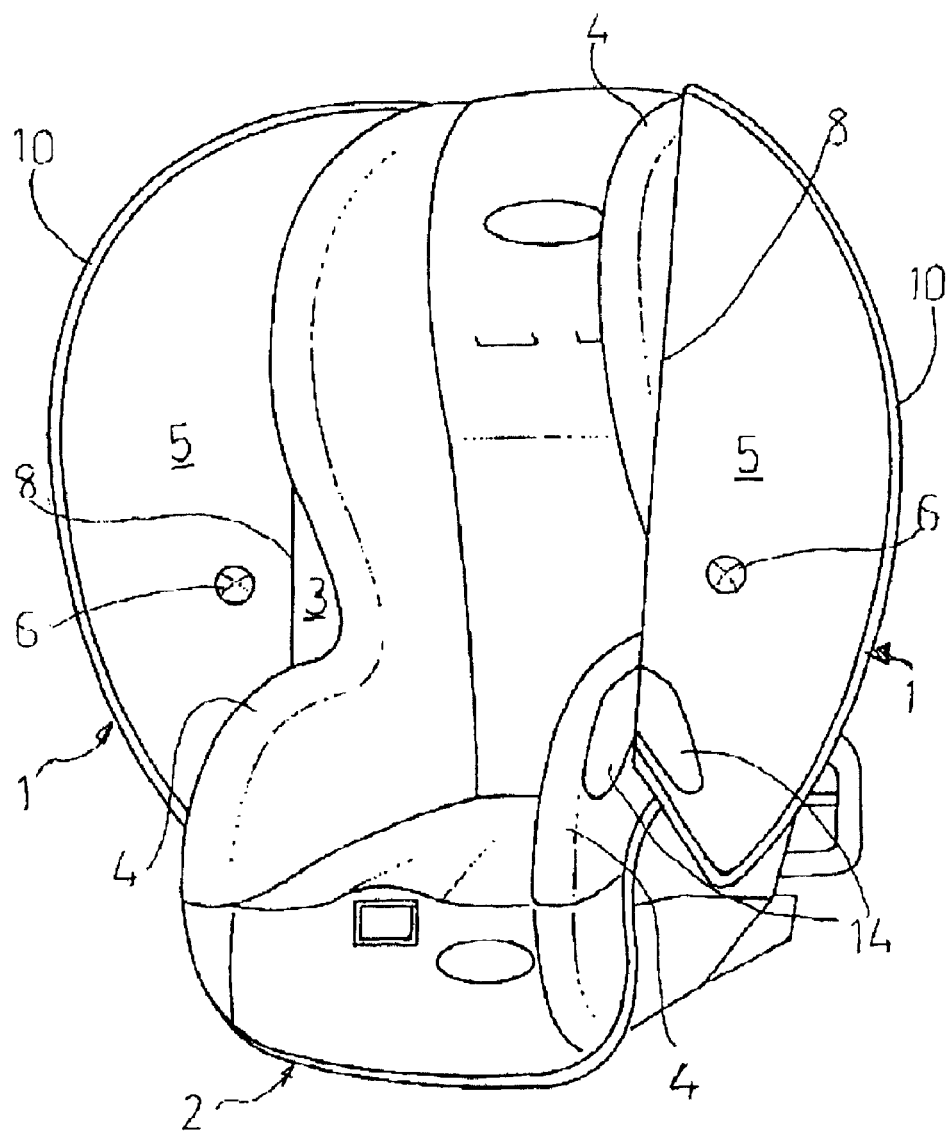
FIG. 2 is a perspective view of the shade apparatus and the child car seat shown in FIG. 1, but a second shade apparatus is attached to the child car seat.

Referring first to FIGS. 1 and 2, there is shown a shade apparatus 1 attachment for a child car seat 2 according to a first embodiment of the invention. The shade apparatus 1 comprises an elongate support 3 that is attachable to a sidewall 4 of the seat 1, a shade member 5 for shading an occupant of the seat 2, and a hinge 8 which interconnects the support 3 and the shade member 5. The support 3 and the shade member 5 are of unitary construction and are in the form of a wing. The shade member 5 has an arcuately shaped extending edge 10.

The shade member 5 is movable relative to the support 3 between an operative position and a retracted position. The left-hand shade member 5 illustrated in FIG. 2 is shown in the operative position and the right-hand shade member 5 illustrated in FIG. 2 is shown in the retracted position. The support 3 and the shade member 5 extend within substantially the same plane when the shade member 5 is in the operative position, and the shade member 5 may shield a head, torso and upper limbs of the occupant. In the retracted position, the shade member 5 extends alongside and in contact with the support 3.

The shade apparatus 1 includes a press stud 6 for retaining the shade member 5 in the retracted position. One part of the press stud 6 is located on the shade member 5 and the other part of the press stud 6 is located on the support 3.

The shade member 5 and support 3 comprise a unitary sheet of plastics material and a crease line 8 within the sheet provides the hinge 8. The sheet is padded with an expanded polystyrene or polyurethane foam and the foam is covered with a fabric matching that of the child seat 2.

The support 3 has two mounts 12, 13 for attaching to the side 4 of the seat 2. The shade member 5 has one mount 14 for attaching to the side 4 of the seat 2, for holding the shade member 5 in the operative position. Each mount 12, 13, 14 is a hook and loop fastener of the type marketed under the Velcro™ brand. A hooked half of a first hook and loop fastener 12 extends along an upper region of the support 3 adjacent the occupant's head and/or upper torso, and a hooked half of a second hook and loop fastener 13 extends along a lower region of the support 3 adjacent the occupant's legs and/or lower torso. Hook and loop fastener 13 also extends along a lower region of the shade member 5 to provide mount 14 (as seen in FIG. 1). The hooked fasteners 12, 13, 14 are attachable to respective looped halves of the fasteners 12, 13, 14 that are sewn onto the side 4 of the child seat 2.

In use, depending on the position of the sun and whether airflow to the occupant is to be encouraged or prevented, the shade apparatus 1 is attached to one or both sides of the seat 2. The shade apparatus 1 may also provide the occupant with a degree of privacy such that a sleeping occupant is prevented from being disturbed by children in adjacent seats or close to the occupant. The hinged connection 8 enables a carer to access the occupant and to remove the occupant from the seat 2 without needing to first detach the shade apparatus 1.

Other advantages of the shade apparatus 1 include that it is easy to operate, inexpensive to manufacture, easy to install, adjustable and poses little danger (if any) to the occupant. Moreover, the shade apparatus 1 is washable.

Figure 3:
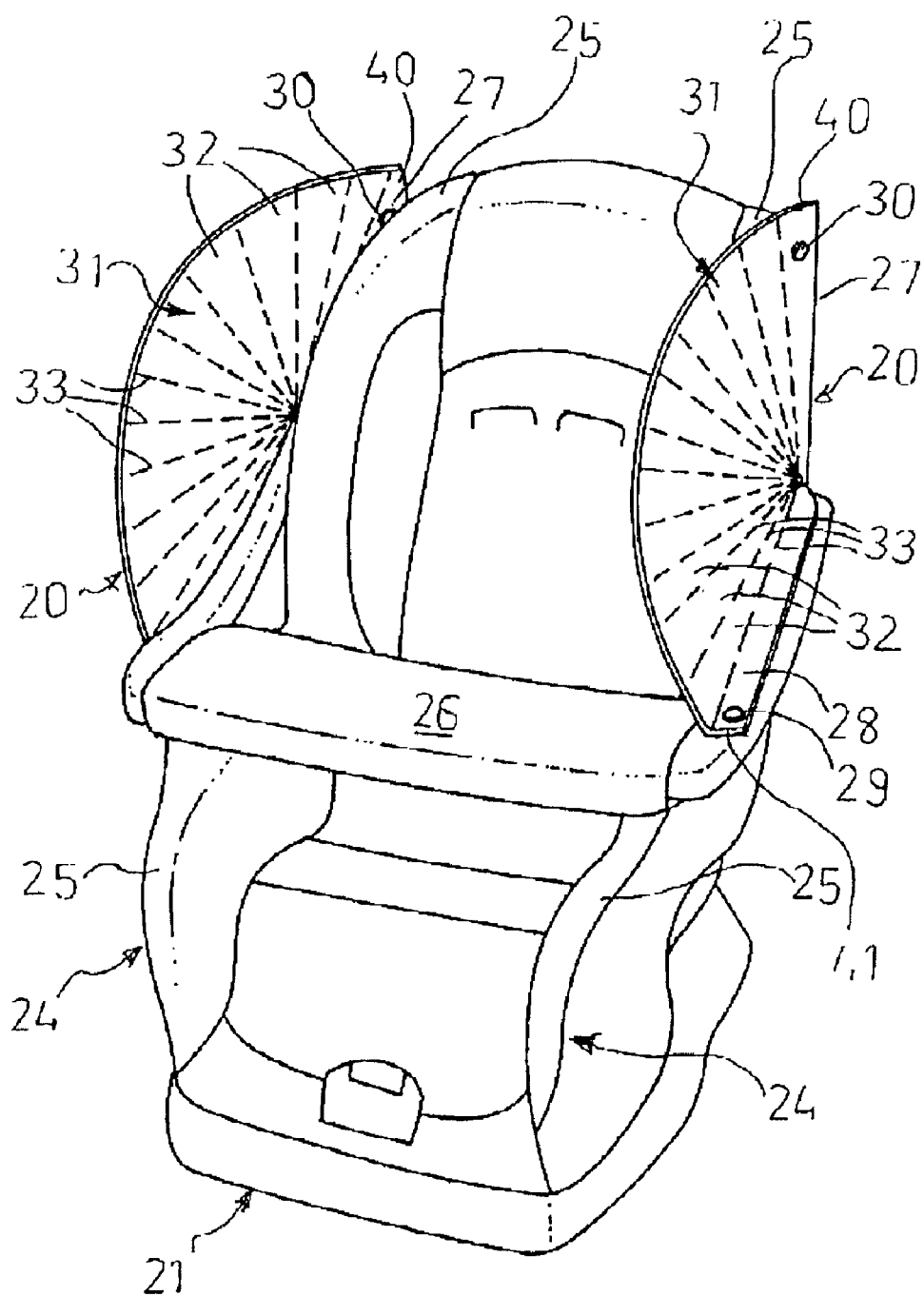
FIG. 3 is a perspective view of a shade apparatus attached to each side of a child car seat, according to another embodiment of the invention.

Referring now to FIG. 3, there is shown a shade apparatus 20 attached to each side 24 of a child car seat 21 according to another embodiment of the invention. The seat 21 includes a sidewall 25 and a swinging arm 26 pivotally connected and rotatable relative thereto. The arm 26 may be rotated upwardly to allow a child to be placed in and removed from the seat 21. The arm 26 may be rotated downwardly to rest against a travel stop (not shown), in which position the arm 26 extends across the child's lap and restrains the child within the seat 21.

The shade apparatus 20 has a support 27 that is attachable to the sidewall 25 by way of a press stud 30. The shade apparatus 20 has a shade member 31 in the form of a fan. Shade member 31 has an edge 28 that is attachable to the arm 26 by way of a press stud 29. Shade member 31 has crease lines 33 extending radially from a point 32 at which the support 27 is pivotally connected to the edge 28 of the shade member 31.

In use, when the arm 26 is rotated upwardly to allow the child access to the seat 21 then the shade member 31 is in a retracted position and in a collapsed state, and when the arm 26 is rotated to a position for restraining the child then the shade member fans 31 out to an operative position. If desired, the shade member may be collapsed whilst the arm 26 is lowered by detaching press stud 30.

In compliance with the statute, the invention has been described in language more or less specific to structural or methodical features. It is to be understood that the invention is not limited to specific features shown or described since the means herein described comprises preferred forms of putting the invention into effect. The invention is, therefore claimed in any of its forms or modifications within the proper scope of the appended claims appropriately interpreted by those skilled in the art.

We claim:

1. A shade apparatus for a child conveyance comprising a support for attachment to a child conveyance and a shade member hingedly connected to the support, wherein the support includes at least one mount for attaching to the conveyance, and wherein the shade member is movable relative to the support between a retracted position whereby ready access to an occupant of the conveyance is permitted and an operative position wherein the shade member extends from a sidewall of the conveyance whereby the occupant is shielded by the shade member, wherein the shade member has a mount for attaching the shade member to the conveyance when in the operative position, for holding the shade member in said operative position, the support and the shade member extending within the same plane when the shade member is in the operative position.

2. The shade apparatus according to claim 1, wherein in the operative position the shade member shields the occupant's head, torso and upper limbs.

3. The shade apparatus according to claim 1, wherein the child conveyance is selected from the group consisting of a baby capsule, child car seat, pram, pusher, stroller, and carriage.

4. The shade apparatus according to claim 1, wherein in the retracted position the shade member extends alongside and in contact with the support.

5. The shade apparatus according to claim 1, wherein the support is elongate and the shade member is hingedly connected along the length of the support.

6. The shade apparatus according to claim 1, wherein the support is formed integrally with the shade member and the support is hingedly connected to the shade member by way of a crease line.

7. The shade apparatus according to claim 1, wherein the support together with the shade member are in the form of a wing.

8. The shade apparatus according to claim 1, wherein the shade member, when viewed in side elevation, has an extending edge that is arcuately shaped.

9. The shade apparatus according to claim 1 further having a retainer for retaining the shade member in the retracted position.

10. The shade apparatus according to claim 9, wherein the retainer comprises a press stud, and one half of a press stud is located on the shade member and the other half of the press stud is located on the support.

11. The shade apparatus according to claim 1, wherein the at least one mount of the support is selected from the group consisting of a hook, clip, press stud, tongue and groove arrangement, magnetic coupling, and a hook and loop fastener.

12. The shade apparatus according to claim 1, wherein the mount of the shade member is selected from the group consisting of a hook, clip, press stud, and a hook and loop fastener.

13. The shade apparatus according to claim 1, wherein the support has a first mount comprising a first half of a first hook and loop fastener extending along an upper region of the support and a second mount comprising a first half of a second hook and loop fastener extending along a lower region of the support, and the mount of the shade member comprises a first half of a hook and loop fastener extending along a lower region of the shade member, and corresponding second halves of each of the said hook and loop fasteners are disposed on a side of the child conveyance.

14. The shade apparatus according to claim 1, wherein the child conveyance has a swinging arm pivotally connected and rotatable relative to the sidewall, the support is attachable to the sidewall and the shade member is attachable to the arm, wherein the arm in an open position retains the shade member in the retracted position and wherein the arm in a closed position retains the shade member in the operative position.

15. The shade apparatus according to claim 14, wherein an edge of the shade member is attachable to the arm, the support is pivotally connected to the edge of the shade member, the shade member is in the form of a fan and crease lines extend radially from a point at which the support is pivotally connected to the edge of the shade member.

16. A child conveyance having at least one shade apparatus, said shade apparatus comprising a support extending from the child conveyance and a shade member hingedly connected to the support, wherein the shade member is movable relative to the support between a retracted position whereby ready access to an occupant of the conveyance is permitted and an operative position wherein the shade member extends from a sidewall of the conveyance whereby the occupant is shielded by the shade member, wherein the shade member has a mount for attaching the shade member to the conveyance when in the operative position, for holding the shade member in said operative position, the support and the shade member extending within the same plane when the shade member is in the operative position.

17. A shade apparatus for a child conveyance comprising a support for attachment to a child conveyance and a shade member hingedly connected to the support, wherein the support includes at least one mount for attaching to the conveyance, and wherein the shade member is movable relative to the support between a retracted position whereby ready access to an occupant of the conveyance is permitted and an operative position wherein the shade member extends from a sidewall of the conveyance whereby the occupant is shielded by the shade member, wherein the retainer comprises a press stud, and one half of a press stud is located on the shade member and the other half of the press stud is located on the support.

* * * * *